United States Patent
Miyazaki et al.

(10) Patent No.: US 6,745,806 B2
(45) Date of Patent: Jun. 8, 2004

(54) RADIAL TIRE FOR HEAVY LOAD WITH SPECIFIED METAL CARCASS CORD

(75) Inventors: Shinichi Miyazaki, Kobe (JP); Kazumi Yamazaki, Kobe (JP); Osamu Toda, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 26 days.

(21) Appl. No.: 09/989,411

(22) Filed: Nov. 21, 2001

(65) Prior Publication Data

US 2002/0117246 A1 Aug. 29, 2002

(30) Foreign Application Priority Data

Nov. 22, 2000 (JP) ........................................ 2000-355992
Nov. 24, 2000 (JP) ........................................ 2000-357927

(51) Int. Cl.[7] .............................. B60C 9/00; B60C 9/04; D07B 1/06
(52) U.S. Cl. ........................... 152/556; 57/212; 57/311; 57/902; 152/451
(58) Field of Search .................. 57/212, 213, 902, 57/311; 152/556, 451, 527

(56) References Cited

FOREIGN PATENT DOCUMENTS

JP              11036182 A    *   2/1999

OTHER PUBLICATIONS

Mechanics of Pneumatic Tires, ed. Samuel Clark: US Department of Transportation, Aug. 1981, p. 874.*

* cited by examiner

*Primary Examiner*—Adrienne C. Johnstone
(74) *Attorney, Agent, or Firm*—Birch, Stewart, Kolasch & Birch, LLP

(57) ABSTRACT

The invention improves rubber permeability while making a cord diameter compact. A metal cord is constituted by a layered structure having a core comprising totally 6 to 12 filaments sectioned into 1 to 4 filament bundles, and a sheath comprising 8 to 15 filaments arranged around the core. Each of the filament bundles includes a waved filament modeled in a two-dimensional wave shape and a non-waved filament, in a state before being bundled. The core makes the wave of the waved filament three-dimensional within the core by applying torsion to each of the filament bundles.

6 Claims, 10 Drawing Sheets

RADIAL TIRE FOR HEAVY LOAD WITH SPECIFIED METAL CARCASS CORD

BACKGROUND OF THE INVENTION

1. Field of the Invention

The present invention relates to a metal cord capable of increasing rubber permeability to an inner portion of a cord while making a diameter of cord compact, and a radial tire for a heavy load using the metal cord for a carcass.

2. Description of the Prior Art

In the carcass of the radial tire for the heavy load, a metal cord obtained by bundling a plurality of filaments is in heavy usage. This kind of metal cord is structured such that a plating treatment is applied to a surface thereof, however, for example, as shown in FIG. 10A, in the case of a compact cord a having no gap between filaments f and f, there is formed a space in which no rubber is permeated between the filaments. Accordingly, there has been a problem that a rust is generated within the cord due to an influence of a water content, thereby causing a reduction of bonding force between the cord and the rubber, a reduction of strength of the cord, a breakage of the cord and the like.

Then, in recent years, in order to improve the problem mentioned above, there has been proposed a so-called open cord b obtained by bundling so that a gap is generated between the filaments as shown in FIG. 10B, and a metal cord c obtained by bundling a filament f1 modeled in a spiral three-dimensional shape and a non-waved filament f2 so as to form a gap between the filaments, thereby increasing a permeability of the rubber, as shown in FIG. 10C.

However, in the cords b and c mentioned above, in order to secure a sufficient permeability of the respective rubbers, there is a disadvantage that a cord diameter is inherently increased.

SUMMARY OF THE INVENTION

Accordingly, an object of the present invention is to provide a metal cord which on the basis of using a metal cord of a layered structure forming a core by adding a torsion to one to four filament bundles having two-dimensional waved filaments and non-waved filaments in a mixed manner, can make a two-dimensional wave three-dimensional wave in accordance with the torsion and can sufficiently secure a rubber permeability while making a cord diameter compact, and a radial tire for a heavy load using the metal cord for a carcass.

Further, in accordance with the present invention, another object is to establish both of a cord strength reduction and a rubber permeability by limiting a wave height, a wave pitch and the like of the modeling of the waved filament to predetermined ranges, and to intend a stability of a tire shape by restricting an extension of the cord at a time of a low load.

In order to achieve the object mentioned above, in accordance a first aspect of the present invention, there is provided a radial tire for a heavy load including:

a carcass extending to a bead core of a bead portion from a tread portion via a side wall portion; and a belt layer arranged inside the tread portion and outside the carcass, wherein a carcass cord of said carcass is constituted by a metal cord having a core comprising totally 6 to 12 filaments sectioned into 1 to 4 filament bundles, and a sheath comprising 8 to 15 filaments arranged around the core, wherein each of said filament bundles includes a waved filament modeled in a two-dimensional wave shape having crests and troughs repeatedly and a non-waved filament, in a state before being bundled, and wherein said core makes the wave of said waved filament three-dimensional within the core by applying a torsion to each of the filament bundles.

DESCRIPTION OF THE PREFERRED EMBODIMENTS

A description will be given below of an embodiment in accordance with the present invention with reference to the accompanying drawings.

Figure 1:
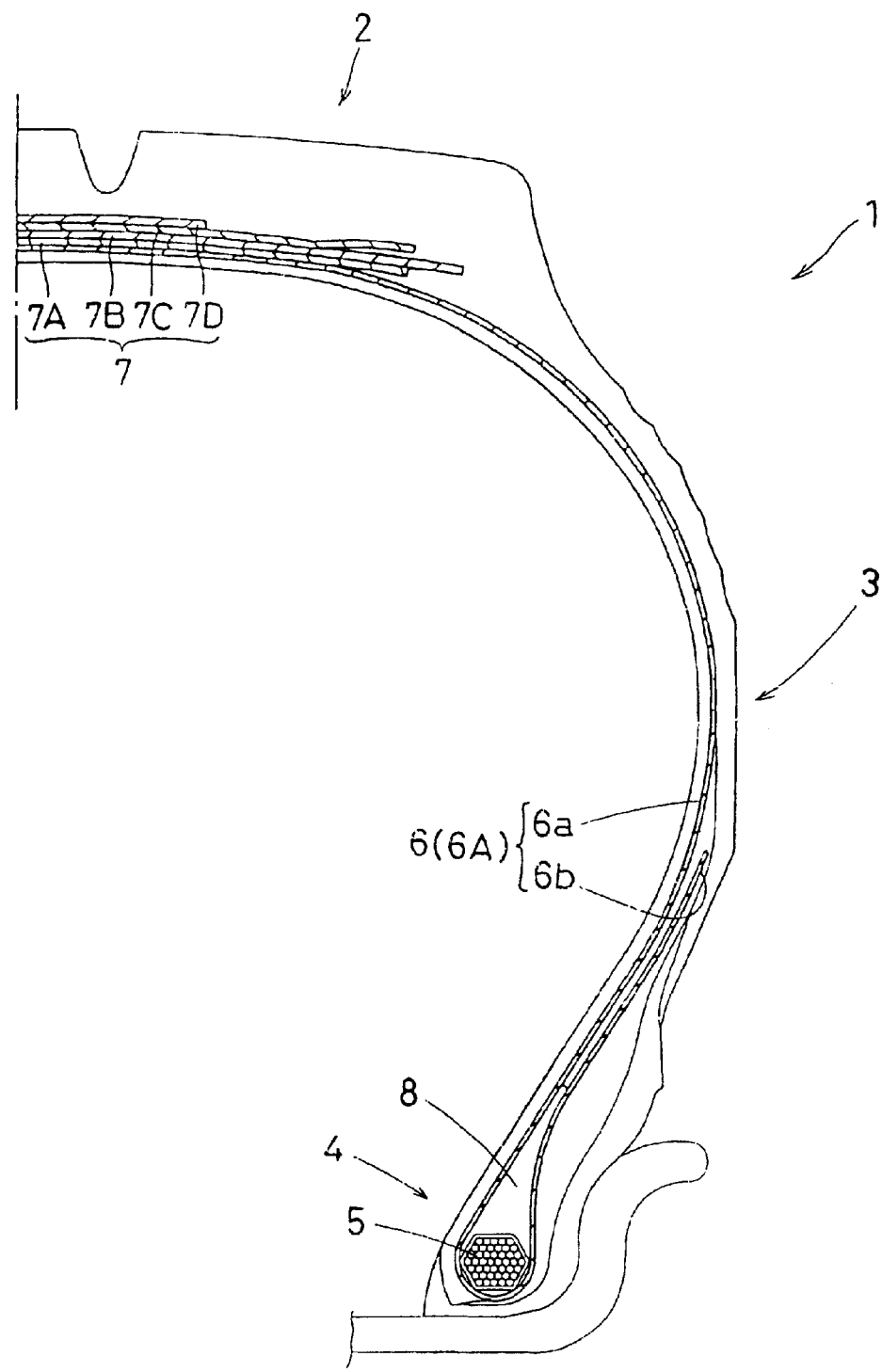
FIG. 1 is a cross sectional view showing a tire for a heavy load in accordance with the present invention.

FIG. 1 is a meridian cross section showing a radial tire for a heavy load in accordance with the present invention.

In FIG. 1, a radial tire 1 for a heavy load is provided with a carcass 6 extending to a bead core 5 of a bead portion 4 from a tread portion 2 via a side wall portion 3, and a belt layer 7 arranged inside the tread portion and outside the carcass 6.

In this case, the belt layer 7 is normally constituted by three to four belt plies. In the present embodiment, there is exemplified a case of a four-sheet structure including an innermost belt ply 7A in which a belt cord using a metal cord is arranged at an angle, for example, about 60±15 degrees with respect to a tire circumferential direction, and belt plies 7B, 7C and 7D arranged at a small angle or 15 to 30 degrees with respect to the tire circumferential direction. The belt plies are overlapped with each other so as to have at least one portion in which the belt cords cross to each other between the plies.

Next, the carcass 6 is provided with fold-back portions 6b which are folded back to an outer side from an inner side in a tire axial direction around the bead core 5, in both sides of a main body portion 6a extending between the bead cores 5 and 5. A bead apex rubber 8 extending to an outer side in a tire radial direction from the bead core 5 in a tapered manner is arranged between the main body portion 6a and the fold-back portion 6b.

Further, the carcass 6 is formed by one of more carcass ply obtained by radially arranging the carcass cords at an angle of 70 to 90 degrees with respect to the tire circumferential direction. In the present embodiment, there is exemplified a case that the carcass 6 is constituted by one carcass ply 6A obtained by arranging the carcass cords at an angle of 90 degrees.

In this case, since a high strength has been conventionally required, a carcass cord having a layered structure with a lot of filaments, for example, 3+9 structure, 3+9+15 structure and the like has been frequently employed as the carcass cord used in the tire for the heavy load such as a truck, a bus and the like. This is because a tensile strength per a cross sectional area tends to be reduced by making the filament thick, and it is necessary to use narrow filaments and increase a number of the filaments, in order to increase the strength with keeping an amount of steel fixed.

Figure 2:
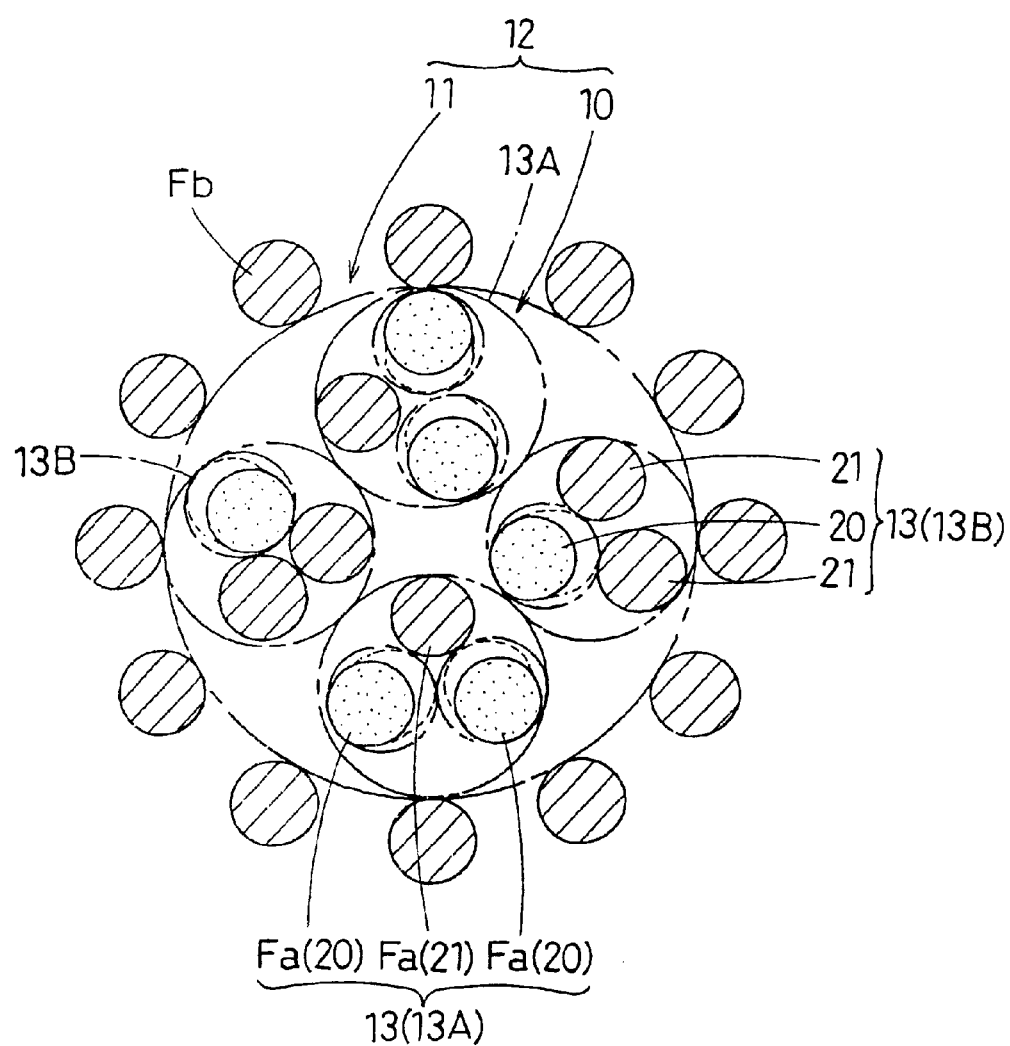
FIG. 2 is a cross sectional view showing a first embodiment of a metal cord used therein.
Figure 7:
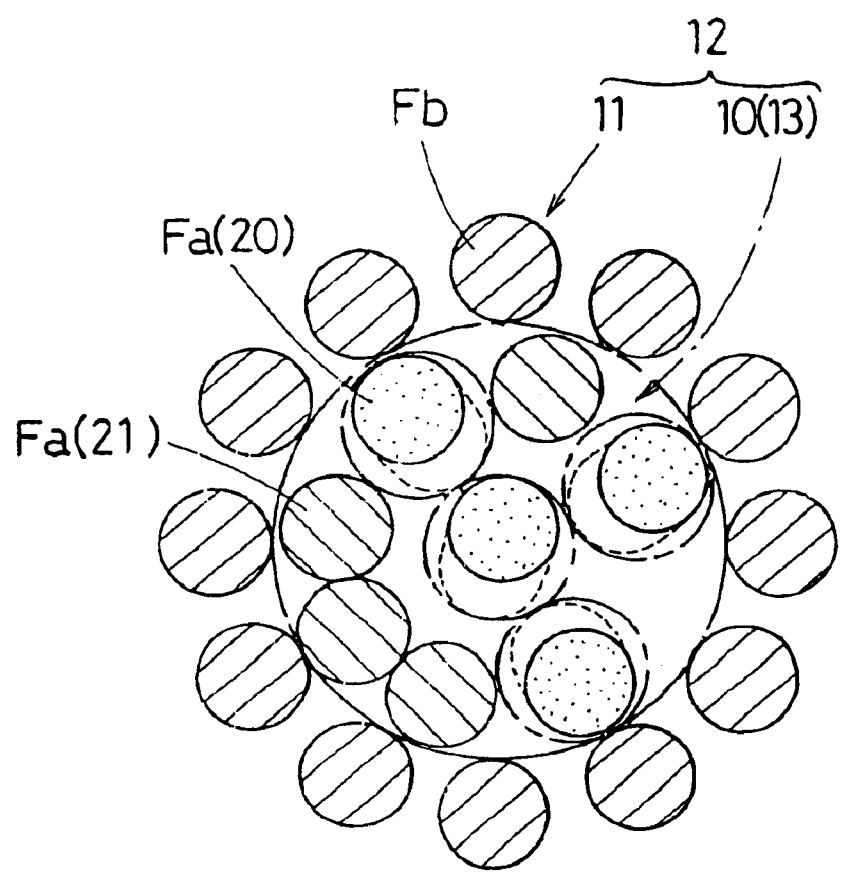
FIG. 7 is a cross sectional view showing a second embodiment of a metal cord.

Accordingly, in the present invention, in order to serve as a substitute of the metal cord such as the 3+9, 3+9+15 structures and the like frequently employed in the carcass of the radial tire for the heavy load and be capable of preferably executing with sufficiently considering a fatigue resistance, there is employed a metal cord of a layered structure having a core 10 including six to twelve filaments Fa and a sheath 11 including eight to fifteen filaments Fb arranged around the core 10, as a carcass cord, as shown in FIGS. 2 and 7.

Then, in the metal cord 12, in order to sufficiently secure a rubber permeability while making a cord diameter compact, a great feature is applied to a matter that the core 10 is structured in the following manner.

That is, the core 10 is constituted by one to four filament bundles 13, and each of the filament bundles 13 includes a waved filament 20 modeled in a two-dimensional wave shape and a non-waved filament 21, in a state before being bundled. Further, the core 10 makes the wave of the waved filament 20 three-dimensional within the core by applying torsion to each of the filament bundles 13.

A description will be given below of a metal cord 12 (FIG. 2) in accordance with a first embodiment in which the core 10 is constituted by a plurality of (2 to 4) filament bundles 13, and a metal cord 12 (FIG. 7) in accordance with a second embodiment in which the core 10 is constituted by one filament bundle 13.

At first, in the metal cord 12 in accordance with the first embodiment, as shown in FIG. 2, the core 10 is constituted by two to four filament bundles 13 in which three filaments Fa are aligned. Accordingly, a total number of the filaments Fa constituting the core 10 is a multiple number of 3, that is, 6, 9 or 12, and the present embodiment exemplifies a case of having 12 filaments.

Figure 4:
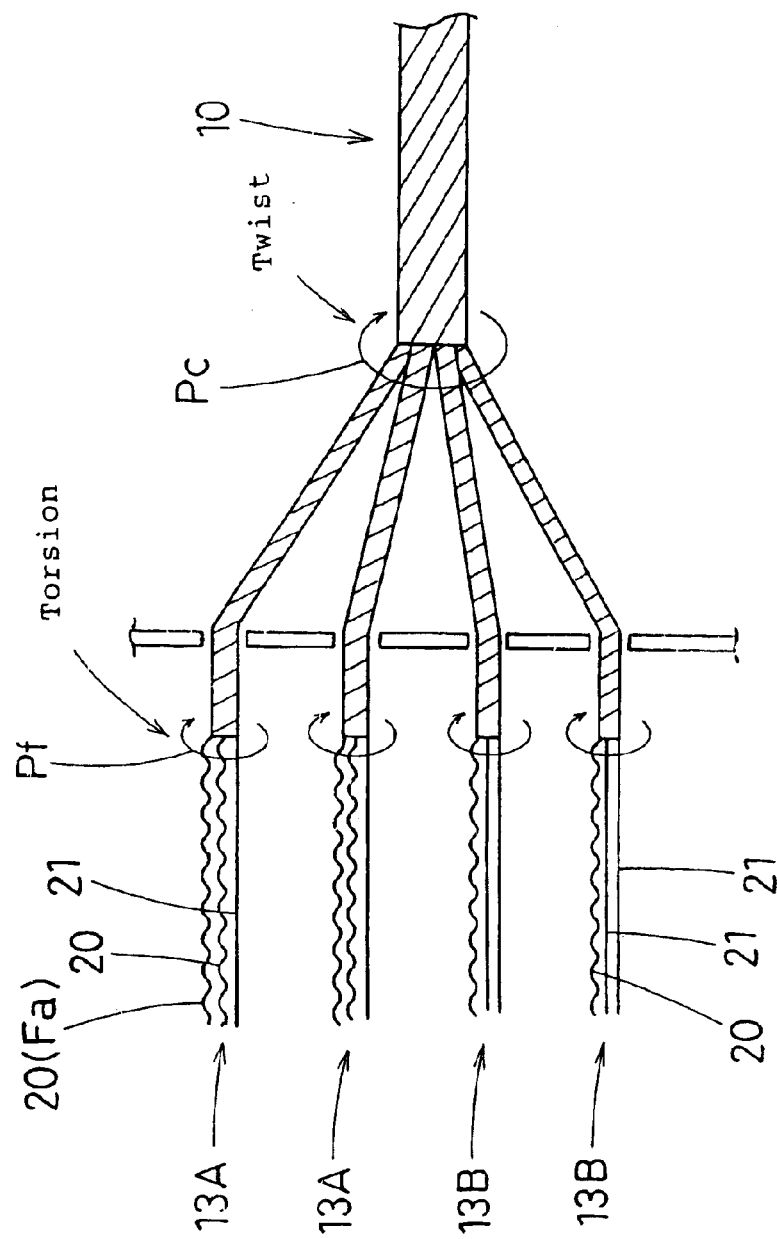
FIG. 4 is a view describing a forming process of a core.

Further, each of the filament bundles 13, as shown in FIG. 4, one core 10 is formed by twisting the respective filament bundles 13 with each other after or at the same time when the torsion is applied to each of said filament bundles 13.

At this time, three filaments Fa constituting the filament bundle 13 is constituted by the waved filament 20 and the non-waved filament 21. In the present embodiment, there is exemplified the case that a filament bundle 13A constituted by two waved filaments 20 and one non-waved filament 21, and a filament bundle 13B constituted by one waved filament 20 and two non-waved filament 21 are mixed, however, the core 10 can be formed only by the filament bundle 13A or only by the filament bundle 13B.

In this case, the non-waved filament 21 corresponds to a conventional filament formed in a substantially linear shape in a state before being bundled.

Figure 3:
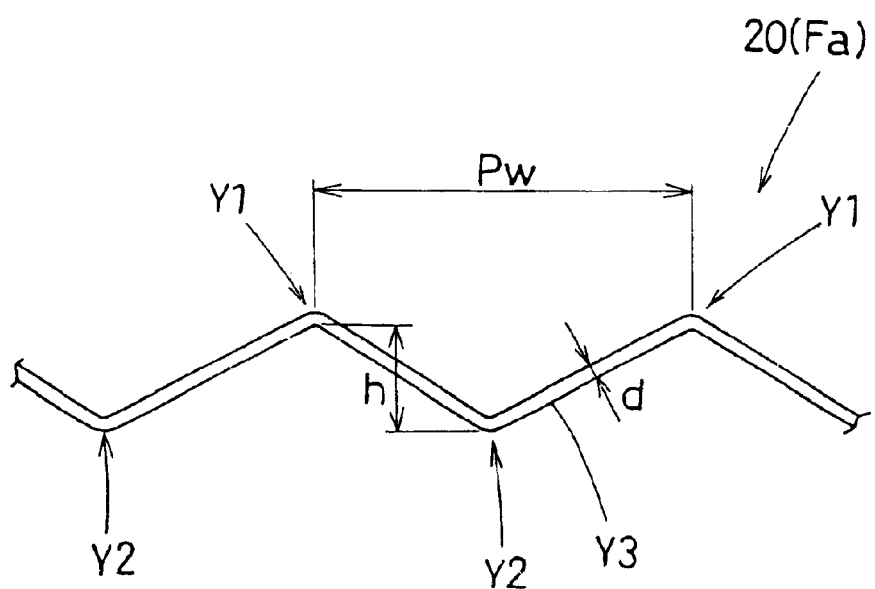
FIG. 3 is a side elevational view showing an example of a waved filament.

On the contrary, the waved filament 20 is, as shown in FIG. 3, modeled in a two-dimensional wave shape in which crest portions Y1 and trough portions Y2 are repeated, in a state before being bundled, and in the present example, there is exemplified a case of being formed in a zigzag shape in which a straight portion Y3 is interposed between the crest portion Y1 and the trough portion Y2. In this case, it is possible to employ a modeling formed in a sine curve or the like which is constituted only by curves.

Further, in this two-dimensional waved filament 20, the two-dimensional wave is made three-dimensional by applying the torsion to the filament bundle 13.

Figure 6A:
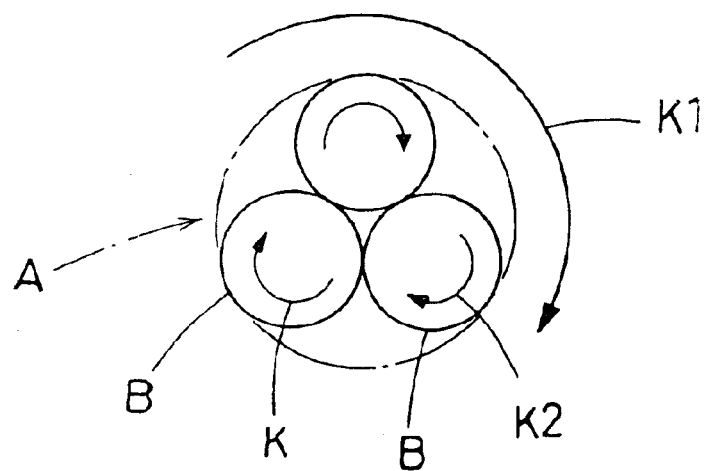
FIGS. 6A and 6B are views describing a three-dimensional forming of a two-dimensional wave due to torsion.
Figure 6B:
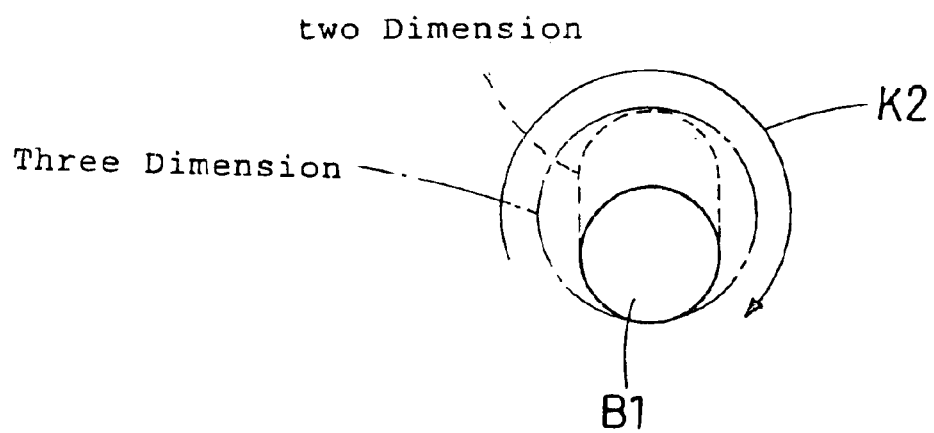

In this case, the following description will be given of making the two-dimensional wave three-dimensional. That is, as schematically shown in FIG. 6A, when applying torsion K1 to the filament bundle A, the torsion K1 is reflected as the same torsion K2 in each of filaments B. At this time, in the case that a waved filament B1 is included in the filament bundle A, each of the waved filaments B1 is twisted around a center by the torsion K2 as schematically shown in FIG. 6B, whereby the two-dimensional wave is made three-dimensional.

As mentioned above, by making the two-dimensional wave three-dimensional due to the torsion, it is possible to stably secure a sufficient gap between the filament Fa and the filament Fb and it is possible to widely improve a rubber permeability while restricting an extension at a time of a low load. Further, since a fretting (an abrasion phenomenon between filaments) can be restricted by securing the gap, a fatigue resistance can be further improved.

Further, the three-dimensional structure has an advantage that it is possible to make the cord compact, for example, in comparison with the structure of being modeled in a three-dimensional spiral shape from the first. In particular, in the case of being formed in the wave shape having the straight portion Y3 as in the present example, it is easy to secure the gap between the filaments at a time of bundling even when the height h of the modeled wave is comparatively small, so that this structure is preferable. Further, since the two-dimensional modeling is easily processed in comparison with the three-dimensional modeling such as the spiral shape or the like, has a high dimensional accuracy and an excellent form stability, and is easily treated, this structure is advantageous in this view.

In this case, the total number of the filaments Fa in the core 10 and the total number of the filaments Fb in the sheath 11 are set among the range mentioned above in correspondence to the required strength at a time of being used in the carcass cord, however, on the assumption of the tire for the heavy load such as the truck, the bus or the like, it is preferably set to nine to twelve in the case of the filaments Fa.

A wire diameter d of the filament Fa and a wire diameter d of the filament Fb are also set on the basis of a relation with respect to the strength required for the carcass cord, however, in the case of the load for the heavy load, a range between 0.15 and 0.30 mm is preferable. When the wire diameter d is less than 0.15 mm, there is a problem that the wire diameter is too small, and is disadvantageous in view of the cord strength and the modeling easily turns back. On the contrary, it is over 0.30 mm, it becomes disadvantageous in view of a bending fatigue.

Further, it is desirably that the filament Fa and the filament Fb are structured such as to have the same diameter, whereby it is possible to make the wire extending process common and it is possible to economically produce the cord.

In this case, it is preferable that the filaments Fa and Fb employ a hard steel wire having a carbon content between 0.78 and 0.86%, in the case that it is less than 0.78%, the strength tends to be reduced, and in the case that is more than 0.86%, the hardness is too high and the strength reduction tends to be increased at a time of modeling.

Next, in the waved filament 20, as shown in FIG. 3, it is preferable to satisfy relations of the following formulas (1) to (2), at a time of setting a wave pitch in a state before being bundled to Pw and a wave height to h. In this case, the wave pitch Pw corresponds to a distance in a longitudinal direction between the crest portions Y1 and Y1, and the wave height h corresponds to a distance in an amplitude direction between the crest portion Y1 and the trough portion Y2.

$$5.0d \leq Pw \leq 30.0d \quad (1)$$

$$0.2d \leq h \leq 3.0d \quad (2)$$

This is because it is hard to secure a rubber permeability if the wave height h becomes less than 0.2 times of the wire diameter d, and a damage applied to the waved filament 20 by the modeling process is large so as to cause a reduction of the filament strength if it becomes over 3.0 times.

Further, if the wave pitch Pw becomes less than 5.0 times of the wire diameter d, the wave pitch Pw becomes too small and the damage caused by the modeling process is large, thereby causing the reduction of the filament strength, and if it becomes over 30 times, the wave pitch Pw becomes too large, and the rubber permeability is reduced.

In this case, on the basis of the same reason, it is preferable to set the wave pitch Pw and the wave height h to a range between 3.0 and 9.0 mm and a range between 0.20 and 0.80 mm, respectively.

Further, in the first embodiment, it is preferable that a twist pitch Pc (shown in FIG. 4) at a time of twisting the filament bundles 13 so as to form one core 10 is between 5.0 and 30.0 mm, and it is preferable that a pitch Pf (shown in FIG. 4) of the torsion applied to each of the filament bundles 13 is set to a comparatively long pitch corresponding to 2 times to 20 times of the twist pitch Pc.

In this case, when the twist pitch Pc is smaller than 5.0 mm, there are disadvantages that an early extension of the cord is increased, a shape change at a time of being applied to the tire becomes great, and the cord strength is reduced. On the contrary, when the twist pitch Pc becomes over 30.0 mm, there are disadvantages that the filaments are easily scattered, and a shape keeping property of the cord is deteriorated.

Further, in the case that the torsion pitch Pf is less than 2.0 times of the twist pitch Pc, the gap between the filaments is reduced so as to reduce the rubber permeability. On the contrary, when it becomes over 20 times, the effect of the three-dimensional structure is reduced. Further, there is generated a problem that the modeling is easily overlapped on the waved filaments, between the filament bundles 13 and 13. Accordingly, it is more preferable that the torsion pitch Pf is 3 times to 10 times of the twist pitch Pc.

Further, it is preferable that the twist pitch Ps of the filament Fb constituting the sheath 11 is set to a range between 5.0 and 30.0 mm. If it is less than 5.0 mm, the extension at a time of the low load of the cord is increased. On the contrary, if it becomes over 30.0 mm, the filaments are easily scattered, and the shape keeping property of the cord is deteriorated. In this case, it is preferable in view of the shape stability of the cord that the twist pitch Ps is set to be larger than the twist pitch Pc.

Further, with respect to the twisting direction of the sheath 11, in the present example, the case of being different from the twisting direction of the core 10 is exemplified, however, it may coincide with the twisting direction of the core 10, and with respect to the torsion direction of the filament bundle 13, in the present example, the case of coinciding with the twisting direction of the core 10 is exemplified, however, it may be different from the twisting direction of the core 10.

Figure 5A:
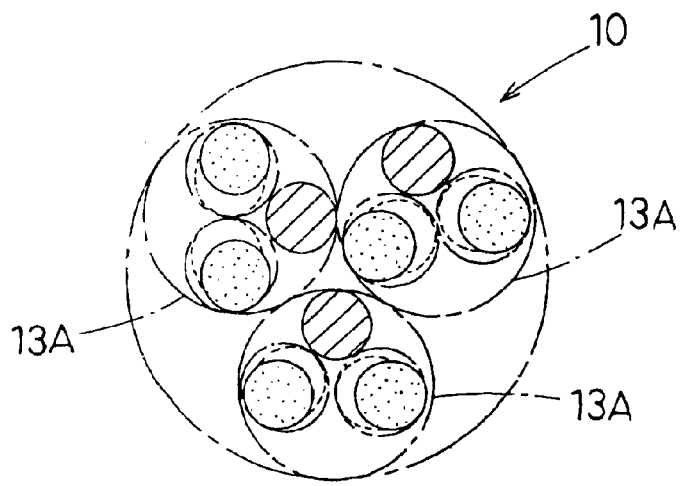
FIGS. 5A and 5B are cross sectional views showing another example of the core of the metal cord in accordance with the first embodiment.
Figure 5B:
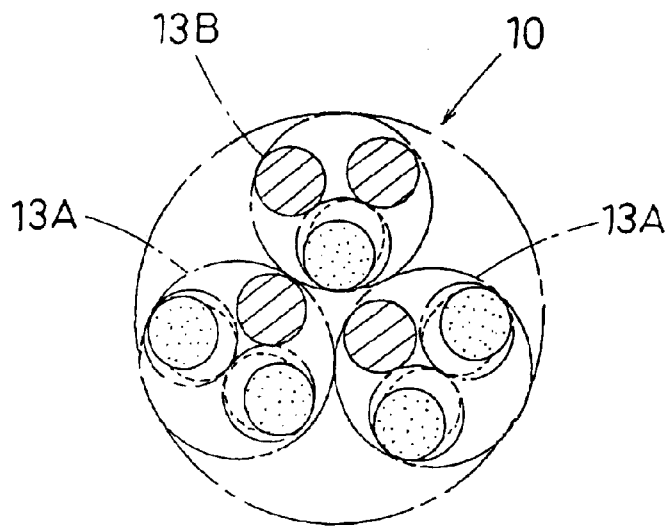

FIGS. 5A and 5B show another example of the core 10 in the first embodiment. In FIG. 5A, there is exemplified a case that the core 10 is constituted by three filament bundles 13A. In FIG. 5B, there is exemplified a case that the core 10 is constituted by two filament bundles 13A and one filament bundle 13B.

Next, a description will be given of a metal cord 12 (shown in FIG. 7) in accordance with a second embodiment.

In the metal cord 12 in accordance with the second embodiment, the core 10 is formed by one filament bundle 13 constituted by six to twelve filaments Fa. The filament Fa is, as mentioned above, constituted by the waved filament 20 (shown in FIG. 3) and the non-waved filament 21.

Figure 8:
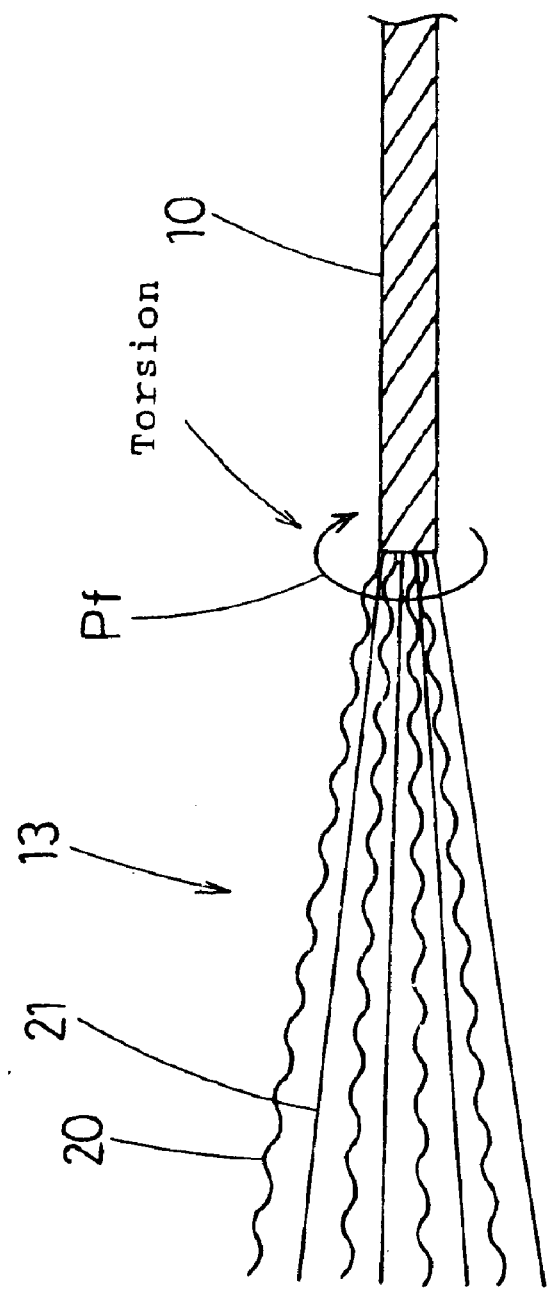
FIG. 8 is a view describing a forming process of a core.

Further, as shown in FIG. 8, the metal cord 12 is formed by twisting the core 10 and the sheath 11, that is, winding the filament Fb around the core 10 while applying the torsion to the filament bundle 13 in which the waved filament 20 and the non-waved filament 21 are aligned with each other.

Due to the torsion, the two-dimensional wave in the waved filament 20 is made three-dimensional within the core. In this case, due to the rubber permeability, it is preferable that two to eight waved filaments 20 are arranged within the filament bundle 13.

Figure 9A:
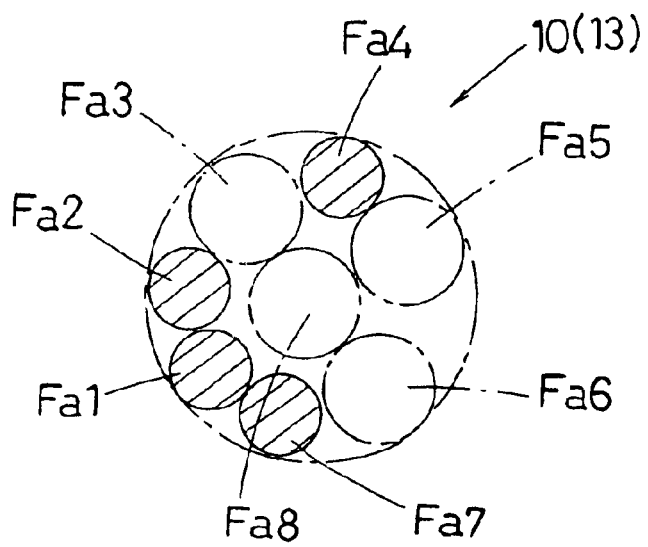
FIGS. 9A and 9B are cross sectional views of the core describing a replacement portion.
Figure 9B:
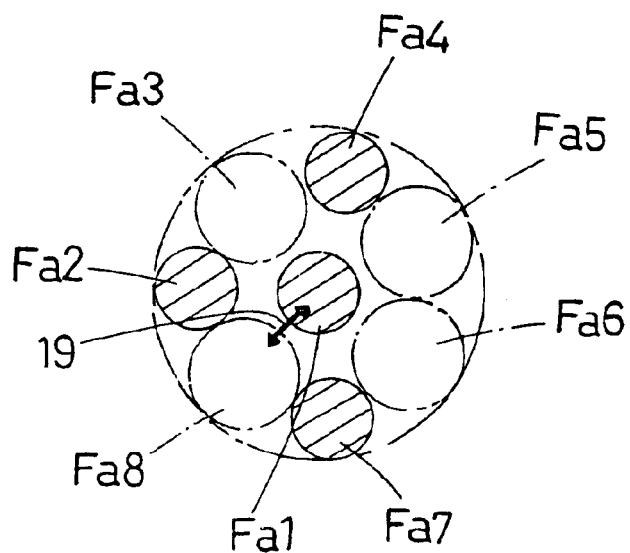
Figure 10A:
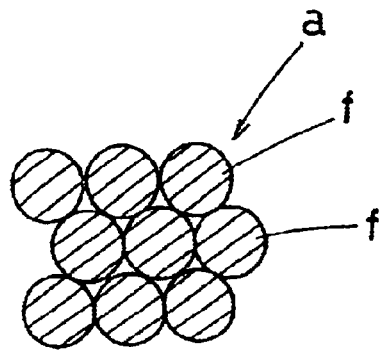
FIGS. 10A to 10C are cross sectional views of a metal cord describing a conventional art.
Figure 10B:
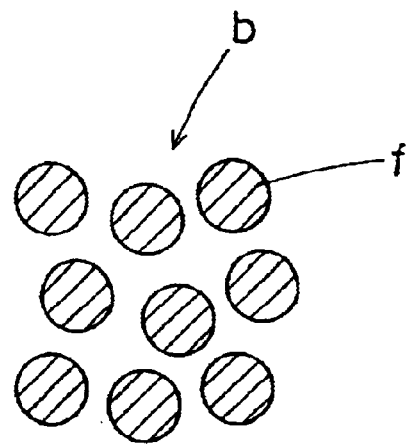
Figure 10C:
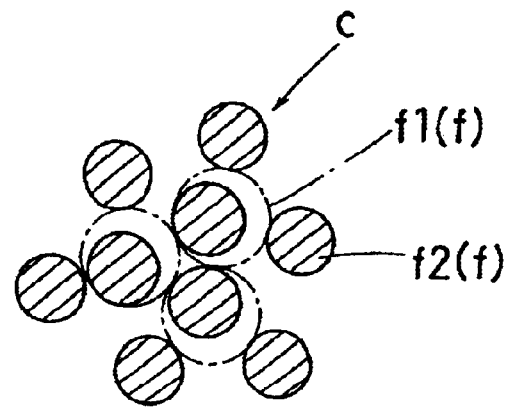

Further, in the second embodiment, since the number of the filaments within the filament bundle 13 is large, it is important to prevent them from being scattered. Accordingly, in the present example, as shown in FIGS. 9A and 9B, a replacement portion 19 in which the positions of the filaments Fa are replaced between the inner side and the outer side is formed within the filament bundle 13. In FIGS. 9A and 9B, reference numerals 1 to 8 are applied to the respective filaments Fa so as to be distinguished, and in the present example, a filament Fa1 and a filament Fa8 are replaced between the inner side and the outer side. By forming the replacement portion 19, a conjuncture is generated between the filaments Fa, whereby it is possible to prevent them from being scattered. Accordingly, it is preferable that five or more replacement portions 19 are formed per a cord length 1 m.

Further, in the second embodiment, it is preferable that the torsion pitch Pf applied to the filament bundle 13 is set to a range between 5.0 and 600.0 mm. In the case that the torsion pitch Pf is smaller than 5.0 mm, an apparent outer diameter of the cord becomes small. On the contrary, in the case that the torsion pitch Pf is larger than 600.0 mm, the effect of the three-dimensional structure is reduced and an improving effect of the rubber permeability can not be sufficiently achieved.

Further, it is preferable that the twist pitch Ps of the sheath 11, that the winding pitch of the filament Fb is set to a range between 5.0 and 30.0 mm in the same manner as that of the first embodiment. In the case that the twist pitch Ps is smaller than 5.0 mm, an early extension of the cord becomes large and a reinforcing effect is deteriorated. Further, since the wire length between the filaments Fa and Fb is largely different, a partial charge of stress becomes unbalanced, and strength at a time of being broken tends to be reduced. On the contrary, when the pitch Ps is over 30.0 mm, the filaments Fb are easily scattered and the shape keeping property of the cord is deteriorated.

The twisting direction of the sheath 11 may be coincident with the torsion direction of the filament bundle 13 or may be different therefrom. Further, it is preferable in view of keeping the cord strength to generally set the torsion pitch Pf to be larger than the twist pitch Ps.

As mentioned above, the description is in detail given of the particularly preferable embodiment in accordance with the present invention, however, the present invention is not limited to the illustrated embodiments but can be modified to various aspects.

(Embodiment 1)

A metal cord is manufactured by way of trial on the basis of the specification shown in Table 1, and a characteristic (a rubber permeability and a cord bending rigidity) of each of the trial cords and a tire performance (a rust generation after traveling and a strength keeping rate after traveling) at a time of using the trial cords in a carcass cord are tested, whereby a comparative evaluation is executed. The specification of the tire is shown in Table 2, and the other items than the carcass cord are all fixed.

Definitions of terms in Table are as follows.

(1) Rubber Permeability

A tire provided with a carcass employing the trial metal cord is manufactured and the metal cord taken out from the tire is dissembled. Further, it is observed whether or not the rubber is completely charged between the filaments within the core, and a rubber permeability is set by a rate of a length of a portion in which the rubber is charged with respect to a whole observed length. The measurement mentioned above is applied to ten cords, and a measured value of the cord is set by an average value.

(2) Bending Rigidity of Cord

Using "v-5 rigidity tester" manufactured by TABER CO., LTD. (U.S.A.), a force (g·cm) at a time of bending the metal cord at an angle of 15 degrees is measured as a bending rigidity of the metal cord.

(3) Rust Generation After Traveling

After traveling the tire about 200 thousands km, the tire is dissembled and the generating condition of the rust in the metal cord is observed and is displayed by an index number obtained by setting a comparative embodiment 1 to 100. The smaller the numerical value is, the less the rust is generated, so that it is good.

(4) Strength Keeping Rate After Traveling

After traveling the tire about 200 thousands km, the tire is dissembled so as to take out the metal cord and the strength of the cord is displayed by an index number obtained by setting that before traveling to 100. The smaller the numerical value is, the less the strength reduction is, so that it is good.

Results of the tests are shown in Table 1.

TABLE 1

|  | COMPARATIVE EMBODIMENT 1 | EMBODIMENT 1 | EMBODIMENT 2 | EMBODIMENT 3 |
|---|---|---|---|---|
| STRUCTURE OF CORD | 3 + 8 + 13 × 0.175 | 3 × 3 + 12 × 0.23 (FIG. 5A) | 3 × 3 + 11 × 0.23 (FIG. 5A) | 3 × 3 + 10 × 0.23 (FIG. 2) |
| CARBON CONTENT (%) | 0.82 | 0.82 | 0.82 | 0.82 |
| NUMBER OF FILAMENTS | — | 3 | 3 | 4 |
| NUMBER OF FILAMENTS WITHIN ONE BUNDLE | — | 3 | 3 | 3 |
| NUMBER OF WAVED FILAMENTS WITHIN ONE BUNDLE | — | 2, 2, 2, | 1, 2, 2, | 1, 2, 1, 2 |
| WAVE SHAPE | — | TWO-DIMENSION | TWO-DIMENSION | TWO-DIMENSION |
| WAVE HEIGHT h (mm) | — | 0.45 | 0.45 | 0.35 |
| WAVE PITCH PW (mm) | — | 5.0 | 5.0 | 3.5 |
| TORSION PITCH Pf OF BUNDLE (mm) | — | 45.0 | 45.0 | 50.0 |
| TWIST PITCH Pc OF CORE (mm) | 5.0 | 15.0 | 15.0 | 10.0 |
| TWIST PITCH Ps OF SHEATH (mm) | 10.0/16.0 *1 | 20.0 | 20.0 | 20.0 |
| CORE DIAMETER (mm) | 1.05 | 1.01 | 1.02 | 1.04 |
| STRENGTH (N/mm$^2$) | 2850 | 2830 | 2900 | 2850 |
| BENDING RIGIDITY OF CORD (g · cm) | 34.1 | 84.2 | 80.2 | 88.2 |
| RUBBER PERMEABILITY INTO CORD INNER PORTION (%) | 10 | 93 | 92 | 91 |
| RUST GENERATION AFTER TRAVELING (INDEX NUMBER) | 100 | 21 | 24 | 27 |
| STRENGTH KEEPING RATE AFTER TRAVELING (INDEX NUMBER) | 88 | 99 | 97 | 96 |

*1 LOWER TWIST/UPPER TWIST

TABLE 2

| TIRE SIZE | 11R22.5 |
|---|---|
| CARCASS | |
| PLY NUMBER (NUMBER) | 1 |
| CORD STRUCTURE | TABLE 1 |
| CORD ANGLE (DEGREE) | 90 (WITH RESPECT TO CIRCUMFERENTIAL DIRECTION) |
| STRIKING NUMBER | 30/5 cm |
| BELT LAYER | |
| PLY NUMBER (NUMBER) | 4 |
| CORD STRUCTURE | 3 × 0.20 + 6 × 0.35 |
| CORD ANGLE (DEGREE) | +65, +20, −20, −20 |
| STRIKING NUMBER | 26/5 cm |

(Embodiment 2)

A metal cord is manufactured by way of trial on the basis of the specification shown in Table 3, and a characteristic (a rubber permeability, a fatigue resistance and a scattering at a time of cutting cord) of each of the trial cords are tested, whereby a comparative evaluation is executed.

(5) Fatigue Resistance

A vulcanized rubber sheet in which the trial cord is inserted to the rubber is manufactured, a repeated bending is applied on the basis of a repeated bending fatigue test (Dematia method) in proportion to JIS L1017 until the rubber sheet is broken, and a broken number is measured. The measurement mentioned above is applied to ten rubber sheets and an average value is estimated on the basis of an index display obtained by setting a value of the comparative embodiment 1 to 100. The larger the numerical value is, the higher the fatigue resistance is, so that it is excellent.

(6) Scattering at a Time of Cutting Cord

The trial cord is cut and it is searched on the basis of a visual observation whether or not the scattering of the cord exists at that time.

wherein a torsion is applied to each of the filament bundles individually so as to make a strand, and the strands are twisted together so as to make said core after or at the same time torsion is applied.

2. A radial tire for a heavy load as claimed in claim 1, wherein the filament of said core has a wire diameter between 0.15 and 0.30 mm and having substantially the same diameter as that of the filament of said sheath.

3. A radial tire for a heavy load as claimed in claim 1, wherein said waved filament satisfies the following relationships:

$$5.0d \leq Pw \leq 30.0d$$

$$0.2d \leq h \leq 3.0d$$

wherein Pw represents the wave pitch and h represents the wave height.

TABLE 3

|  | COMPARATIVE EMBODIMENT 1 | EMBODIMENT 1 | EMBODIMENT 2 | EMBODIMENT 3 |
|---|---|---|---|---|
| STRUCTURE (LAYER BUNDLING) | 3 + 8 + 13 | 8 + 12 (FIG. 7) | 8 + 12 (FIG. 7) | 9 + 14 |
| FILAMENT OF CORE |  |  |  |  |
| WIRE DIAMETER d (mm) | 0.20 | 0.25 | 0.25 | 0.20 |
| OF WAVED FILAMENT NUMBER (NUMBER) | 0 | 4 | 4 | 7 |
| WAVE PITCH Pw (mm) | — | 4.5 | 4.5 | 5.0 |
| WAVE HEIGHT h (mm) | — | 0.45 | 0.45 | 0.50 |
| TORSION PITCH Pn OF BUNDLE (mm) | — | 30 | 30 | 30 |
| NUMBER OF REPLACEMENT PORTION (TIMES/1 m) | 0 | 0 | 0 | 1 |
| FILAMENT OF SHEATH |  |  |  |  |
| WIRE DIAMETER d (mm) | 0.20 | 0.25 | 0.25 | 0.20 |
| TWIST PITCH Py OF SHEATH (mm) | 10.0/16.0 | 15 | 15 | 15 |
| SCATTERING OF CORD | OBSERVED | OBSERVED | NOT OBSERVED | NOT OBSERVED |
| RUBBER PERMEABILITY | 23 | 75 | 95 | 97 |
| FATIGUE RESISTANCE | 100 | 133 | 143 | 144 |

As mentioned above, in accordance with the present invention, it is possible to effectively prevent the bonding force between the cord and the rubber from being reduced and the strength of the cord from being reduce due to the rust generation within the cord, and further it is possible to effectively prevent the cord from being damaged, for example, being broken or the like, while making the cord diameter compact. Further, it is possible to increase the fatigue resistance and maintain the high strength keeping rate, whereby it is possible to achieve the excellent durability.

What is claimed is:

1. A radial tire for a heavy load comprising:

a carcass extending to a bead core of a bead portion from a tread portion via a side wall portion; and a belt layer arranged inside the tread portion and outside the carcass, wherein a carcass cord of said carcass is constituted by a metal cord having a core comprising totally 6 to 12 filaments sectioned into 2 to 4 filament bundles, and a sheath comprising 8 to 15 filaments arranged around the core, wherein each of said filament bundles includes a waved filament modeled in a two-dimensional wave shape having crests and troughs repeatedly and a non-waved filament, in a state before being bundled, and 4. A radial tire for a heavy load comprising:

a carcass extending to a bead core of a bead portion from a tread portion via a side wall portion; and a belt layer arranged inside the tread portion and outside the carcass, wherein a carcass cord of said carcass is constituted by a metal cord having a core comprising from 2 to 4 filament bundles each constituted by 3 filaments, and a sheath comprising 8 to 15 filaments arranged around the core, wherein each of said filament bundles includes a waved filament modeled in a two-dimensional wave shape having crests and troughs repeatedly and a non-waved filament, in a state before being bundled, and wherein a torsion is applied to each of said filament bundles individually together so as to make a strand, and the strands are twisted together so as to make said core after or at the same time said torsion is applied.

5. A radial tire for a heavy load comprising:

a carcass extending to a bead core of a bead portion from a tread portion via a side wall portion; and a belt layer arranged inside the tread portion and outside the carcass, wherein a carcass cord of said carcass is constituted by a metal cord having a core comprising totally 6 to 12 filaments sectioned into 2 to 4 filament bundles, and a sheath comprising 8 to 15 filaments arranged around the core, wherein each of said filament bundles includes a waved filament modeled in a two-dimensional wave shape having crests and troughs repeatedly and a non-waved filament, in a state before being bundled, and wherein a torsion is applied to each of the filament bundles individually so as to make a strand, and the strands are twisted together so as to make said core after or at the same time said torsion is applied, and wherein the twist pitch of said core is between 5 and 30 mm, and the torsion pitch of each of the filament bundles is equal to or more than 2 times said twist pitch and equal to or less than 20 times said twist pitch.

6. A radial tire for a heavy load comprising:

a carcass extending to a bead core of a bead portion from a tread portion via a side wall portion; and a belt layer arranged inside the tread portion and outside the carcass, wherein a carcass cord of said carcass is constituted by a metal cord having a core comprising totally 6 to 12 filaments sectioned into 2 to 4 filament bundles, and a sheath comprising 8 to 15 filaments arranged around the core, wherein each of said filament bundles includes a waved filament modeled in a two-dimensional wave shape having crests and troughs repeatedly and a non-waved filament, in a state before being bundled, wherein a torsion is applied to each of said filament bundles individually so as to make a strand, and the strands are twisted together so as to make said core after or at the same time said torsion is applied, and wherein the twist pitch of said sheath is between 5 and 30 mm.

* * * * *